US008134570B1

(12) United States Patent
Duluk, Jr. et al.

(10) Patent No.: US 8,134,570 B1
(45) Date of Patent: Mar. 13, 2012

(54) SYSTEM AND METHOD FOR GRAPHICS ATTRIBUTE PACKING FOR PIXEL SHADER USAGE

(75) Inventors: Jerome F. Duluk, Jr., Palo Alto, CA (US); Andrew J. Tao, San Francisco, CA (US); Roger L. Allen, Lake Oswego, OR (US); Svetoslav D. Tzvetkov, Irvine, CA (US); Yan Yan Tang, San Jose, CA (US); Elena M. Ing, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 600 days.

(21) Appl. No.: 11/532,779

(22) Filed: Sep. 18, 2006

(51) Int. Cl.
*G09G 5/00* (2006.01)

(52) U.S. Cl. ........ 345/581; 345/419; 345/582; 345/506; 345/422; 345/643; 382/154; 382/285; 382/295

(58) Field of Classification Search .................. 345/418, 345/581, 582, 583, 506, 420, 422, 419, 643; 382/154, 285, 295
See application file for complete search history.

(56) References Cited

U.S. PATENT DOCUMENTS

| | | | | |
|---|---|---|---|---|
| 5,949,428 A * | 9/1999 | Toelle et al. | ............. | 345/589 |
| 6,342,888 B1 * | 1/2002 | Lindholm et al. | ............. | 345/426 |
| 6,532,009 B1 * | 3/2003 | Fox et al. | ............. | 345/419 |
| 6,629,188 B1 * | 9/2003 | Minkin et al. | ............. | 711/3 |
| 6,636,223 B1 * | 10/2003 | Morein | ............. | 345/581 |
| 6,661,421 B1 * | 12/2003 | Schlapp | ............. | 345/530 |
| 6,664,963 B1 * | 12/2003 | Zatz | ............. | 345/426 |
| 6,760,019 B1 * | 7/2004 | Graham | ............. | 345/418 |
| 6,947,047 B1 * | 9/2005 | Moy et al. | ............. | 345/501 |
| 7,202,872 B2 * | 4/2007 | Paltashev et al. | ............. | 345/555 |
| 7,450,132 B2 * | 11/2008 | Park et al. | ............. | 345/582 |
| 7,809,250 B2 * | 10/2010 | Seo et al. | ............. | 386/241 |
| 2002/0024522 A1 * | 2/2002 | Schimpf et al. | ............. | 345/519 |
| 2002/0033817 A1 * | 3/2002 | Boyd et al. | ............. | 345/419 |
| 2003/0142105 A1 * | 7/2003 | Lavelle et al. | ............. | 345/558 |
| 2003/0169255 A1 * | 9/2003 | Lavelle et al. | ............. | 345/426 |
| 2004/0012598 A1 * | 1/2004 | Zatz | ............. | 345/506 |
| 2004/0012602 A1 * | 1/2004 | Mech | ............. | 345/581 |
| 2004/0221071 A1 * | 11/2004 | Baker et al. | ............. | 710/20 |
| 2004/0240755 A1 * | 12/2004 | Wong et al. | ............. | 382/293 |
| 2005/0027564 A1 * | 2/2005 | Yantis | ............. | 705/2 |
| 2005/0093873 A1 * | 5/2005 | Paltashev et al. | ............. | 345/581 |
| 2005/0122334 A1 * | 6/2005 | Boyd et al. | ............. | 345/520 |
| 2005/0190183 A1 * | 9/2005 | Barone et al. | ............. | 345/427 |
| 2005/0243094 A1 * | 11/2005 | Patel et al. | ............. | 345/506 |
| 2006/0098018 A1 * | 5/2006 | Tarditi et al. | ............. | 345/505 |
| 2006/0098019 A1 * | 5/2006 | Tarditi, et al. | ............. | 345/505 |
| 2007/0002070 A1 * | 1/2007 | Hoppe et al. | ............. | 345/582 |
| 2007/0030278 A1 * | 2/2007 | Prokopenko et al. | ............. | 345/506 |
| 2007/0146197 A1 * | 6/2007 | Wimmer | ............. | 342/185 |
| 2008/0049031 A1 * | 2/2008 | Liao et al. | ............. | 345/530 |

\* cited by examiner

*Primary Examiner* — Andrew Wang
*Assistant Examiner* — Abderrahim Merouan
(74) *Attorney, Agent, or Firm* — Zilka-Kotab, PC

(57) ABSTRACT

A system, method and computer program product are provided for packing graphics attributes. In use, a plurality of graphics attributes is identified. Such graphics attributes are packed, such that the packed graphics attributes are capable of being processed utilizing a pixel shader.

16 Claims, 6 Drawing Sheets

SYSTEM AND METHOD FOR GRAPHICS ATTRIBUTE PACKING FOR PIXEL SHADER USAGE

FIELD OF THE INVENTION

The present invention relates to graphics processing, and more particularly to processing graphics attributes utilizing a pixel shader.

BACKGROUND

Typical graphics processors are equipped various "shaders" for determining surface properties of different graphics data. For example, vertex shaders are typically provided for determining the surface properties of a vertex. Still yet, pixel shaders are traditionally included downstream with respect to the vertex shaders as well as others) for determining the surface properties of a pixel or portion thereof (e.g. fragment, etc.).

Traditionally, the shaders upstream from the pixel shader are capable of outputting more graphics attributes than the pixel shader is capable of using. To this end, the amount of graphics attributes that are typically sent to pixel shaders, from upstream shaders, is often excessive and results in the transmission, storage, etc. of unused graphics data. Unfortunately, this, in turn, results in less than optimal storage use, an increase in unnecessary computation, overly complex hardware logic at the pixel shader, etc.

There is thus a need for overcoming these and/or other problems associated with the prior art.

SUMMARY

A system, method, and computer program product are provided for packing graphics attributes. In use, a plurality of graphics attributes is identified. Such graphics attributes are packed, such that the packed graphics attributes are capable of being processed utilizing a pixel shader.

Yet another system, method, and computer program product are provided for providing a reorder table. Included is a data structure embodied on a computer readable medium. Such data structure includes a reorder table in communication with a first shader and a second shader. In use, the reorder table is adapted for being used to map an output of the first shader to an input of the second shader.

Still yet another system, method, and computer program product are provided for packing graphics attributes. A subset of a plurality of graphics attributes is first identified. Thus, the subset of graphics attributes may be processed utilizing a pixel shader.

DETAILED DESCRIPTION

Figure 1A:
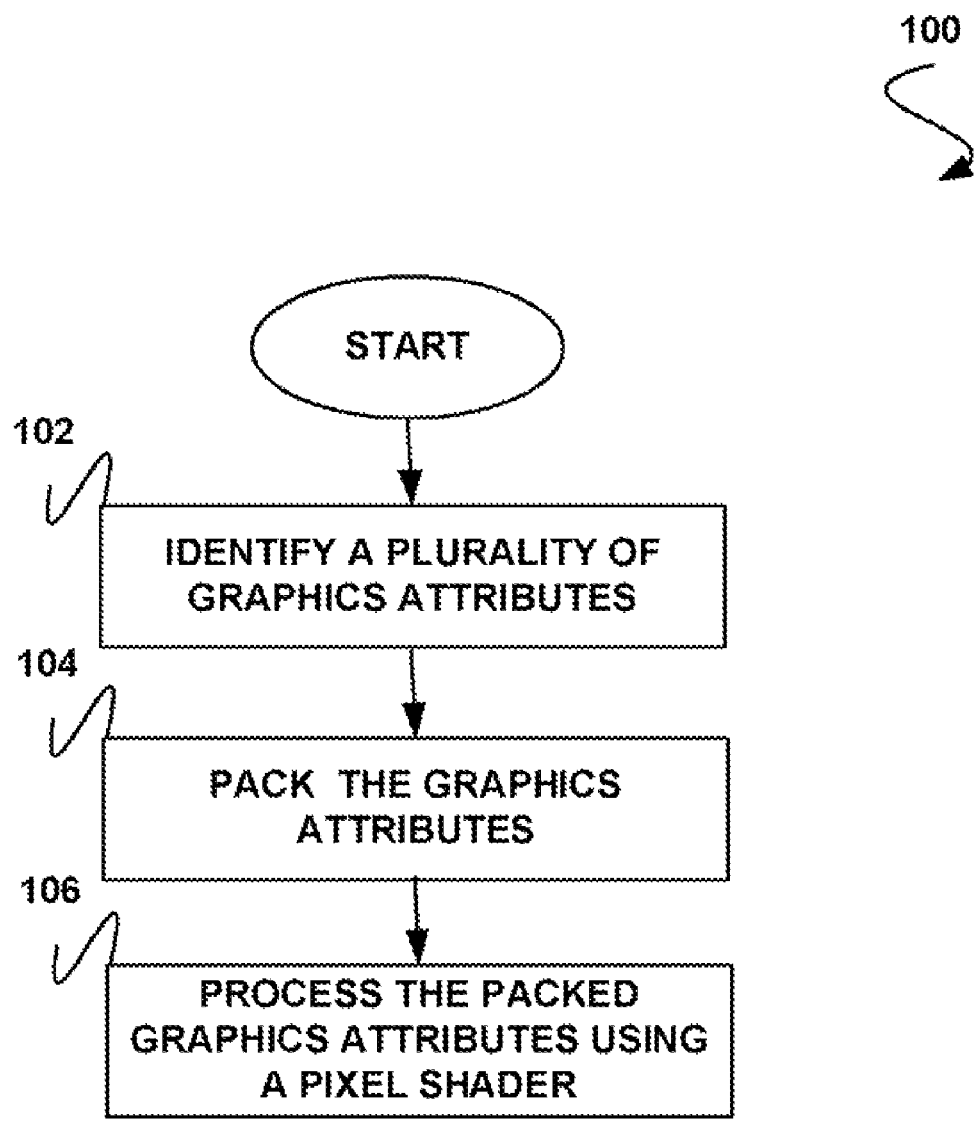
FIG. 1A shows a method for packing graphics attributes for use by a pixel shader, in accordance with one embodiment.

FIG. 1A shows a method 100 for packing graphics attributes for use by a pixel shader, in accordance with one embodiment. As shown, a plurality of graphics attributes is identified. See operation 102. In the context of the present description, such graphics attributes may include, but are not limited to color attributes, clipping attributes, point size attributes, coordinates, and/or any other attributes associated with graphics data capable of being processed by a shader (e.g. pixel shader, etc.). More exemplary graphics attributes will be set forth hereinafter in greater detail during reference to subsequent figures.

Still yet, the graphics attributes may be identified in any desired manner, using any desired logic, method, etc. Just by way of example, in various embodiments, the graphics attributes that are stored in a buffer and used as input or output from a shader may be identified by examining the input or output from another shader. Such other shader may include a vertex shader, a geometry shader, a tessellation shader, and/or any other component of a graphics pipeline, for that matter.

in operation 104, the graphics attributes are packed. In one embodiment, this can optionally be done as the attributes are stored into a temporary buffer, for example. As will soon become apparent during reference to subsequent figures, additional processing may optionally be carried out on the graphics attributes, prior to the packing of operation 104. To this end, the packed graphics attributes may be processed utilizing the pixel shader. See operation 106. Such pixel shader processing may refer to any determination of surface properties of a pixel or portion thereof (e.g. fragment, etc), and/or any other processing capable of being performed by the pixel shader.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
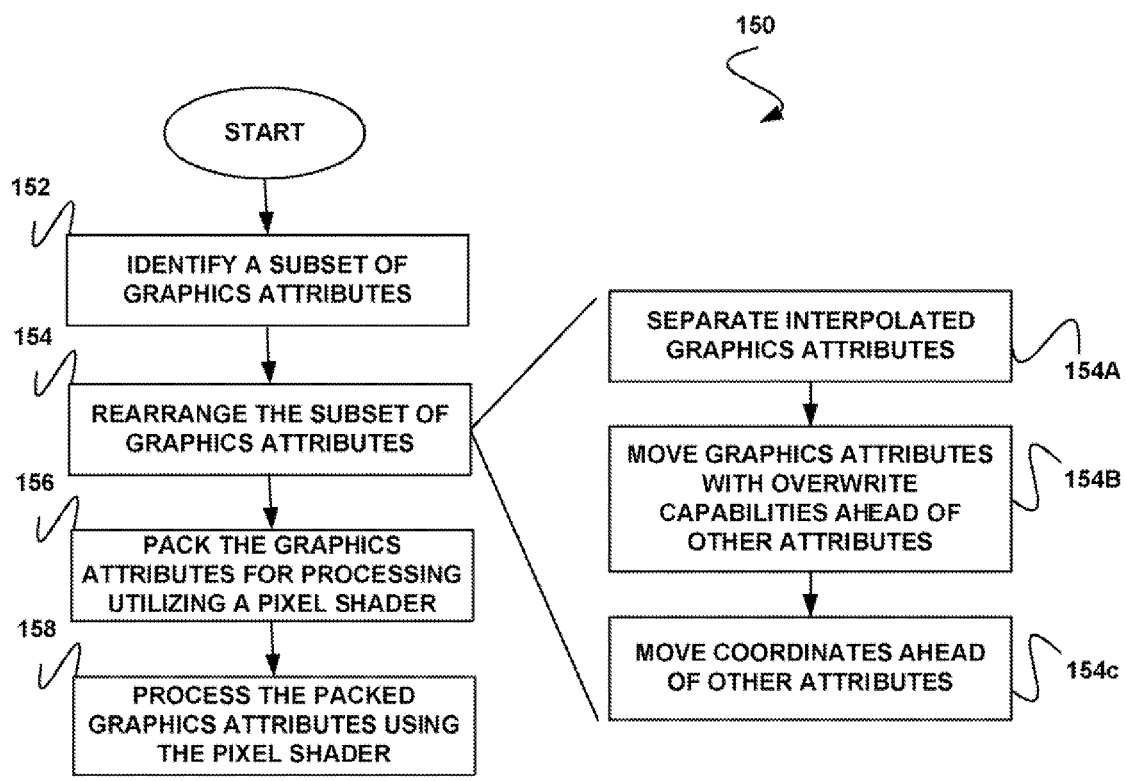
FIG. 1B shows a method for packing and processing graphics attributes for use by a pixel shader, in accordance with another embodiment.

FIG. 1B shows a method 150 for packing and processing graphics attributes for use by a pixel shader, in accordance with another embodiment. As an option, the present method 150 may be implemented in the context of the functionality of FIG. 1A. Of course, however, the method 150 may be implemented in any desired environment. Further, the aforementioned definitions may similarly apply during the description of the present figure.

As shown in FIG. 1B, a subset of graphics attributes is identified. Note operation 152. Such subset of graphics attributes may include any of those that are required by a pixel shader. For example, a plurality of graphics attributes provided by previous components of a graphics pipeline (e.g. a vertex shader, a geometry shader, a tessellaton shader, etc.) may include a set that is, at least in part, not required by the pixel shader. Therefore, only a subset of such graphics attributes is identified in operation 152, so as to, at least in part, avoid subsequent storage, communication, processing, etc of un-required graphics attributes by the pixel shader.

Next, in operation 154, the subset of graphics attributes are rearranged in various ways to optimize receipt and/or processing by a subsequent pixel shader. It should be noted that the aforementioned rearrangement may involve any techniques that result in the graphics attributes being arranged differently than that in which they were received. To this end, the following examples of rearrangement are set forth for illustrative purposes only.

Just by way of example, as indicated in operation 154A, the graphics attributes may be separated into a plurality of groups. Specifically, in one embodiment, the groups may include a first group including interpolated attributes, and a second group including non-interpolated (e.g. constant, etc.) attributes. By separating the graphics attributes in such manner, interpolated attributes and non-interpolated attributes may be arranged to provide economies in the hardware. For example, since plane equations are needed for interpolating the non-constant attributes, and not needed for constant attributes, separating the attributes into constant and non-constant sets makes the storage and address computation of the attributes easier to do in hardware and/or with pixel shader instructions. By separating the graphics attributes in the foregoing manner, an identification of non-constant attributes is inherently simplified, since the shader program would simply need to select, graphics attributes from the first group of interpolated attributes. This may, in some embodiments, optionally optimize storage, reduce unnecessary computation, accommodate or possibly allow a reduction of hardware logic, etc.

Still yet, the rearrangement of the graphics attributes of operation 154 may further involve the identification of a plurality of the graphics attributes having overwrite capabilities. Such overwrite capabilities may involve any ability to overwrite other graphics attributes. To this end, such graphics attributes having overwrite capabilities may be moved before other graphics attributes. See operation 154B. By forcing such overwriting graphics attributes before others in an attribute stream, the hardware design is simplified, because the overwriting attributes can be saved in a temporary buffer until the overwritten attributes arrive, and then the overwriting attributes can take the place of the overwritten attributes, if the overwritten attributes were to come prior to the overwriting attributes, in some embodiments, the overwriting could not necessarily take place easily, since the overwritten attributes have already been passed along in the graphics pipeline.

Even still, in operation 154C, coordinates (e.g. x, y, z, w, s, t, etc.) may be moved ahead of other graphics attributes. In some embodiments, pixel shader processing may almost always require use of such coordinates. Thus, by moving them ahead in the graphics attributes stream, they may be addressed ahead of others, in order to simplify various types of processing, such as clipping, which involved the interpolation of attributes. Specifically, if vertex coordinates are received before attributes, clipping parameters can be computed before the attributes are processed, which means the clipping attributes are available when the attributes arrive.

Next, in operation 156, the graphics attributes may then be packed. Such packing may be similar to that set forth in operation 106 of FIG. 1A. For example, in some embodiments, the graphics attributes may be packed to include a contiguous set (or subset) of graphics attributes. As a further option, such contiguously packed attributes may be arranged, at least in part, such that no graphics attributes (and/or null values, spaces, etc.) are positioned therebetween. To this end, the graphics attributes may be optimally prepared for processing by a pixel shader in operation 158. Operation 158 may, in one embodiment, include pre-processing the attributes in preparation for the attributes being processed by the pixel shader. In various embodiments, possible pre-processing may include, but is not limited to: plane equation generation; clamping values, and interpolation of attribute values.

Figure 2:
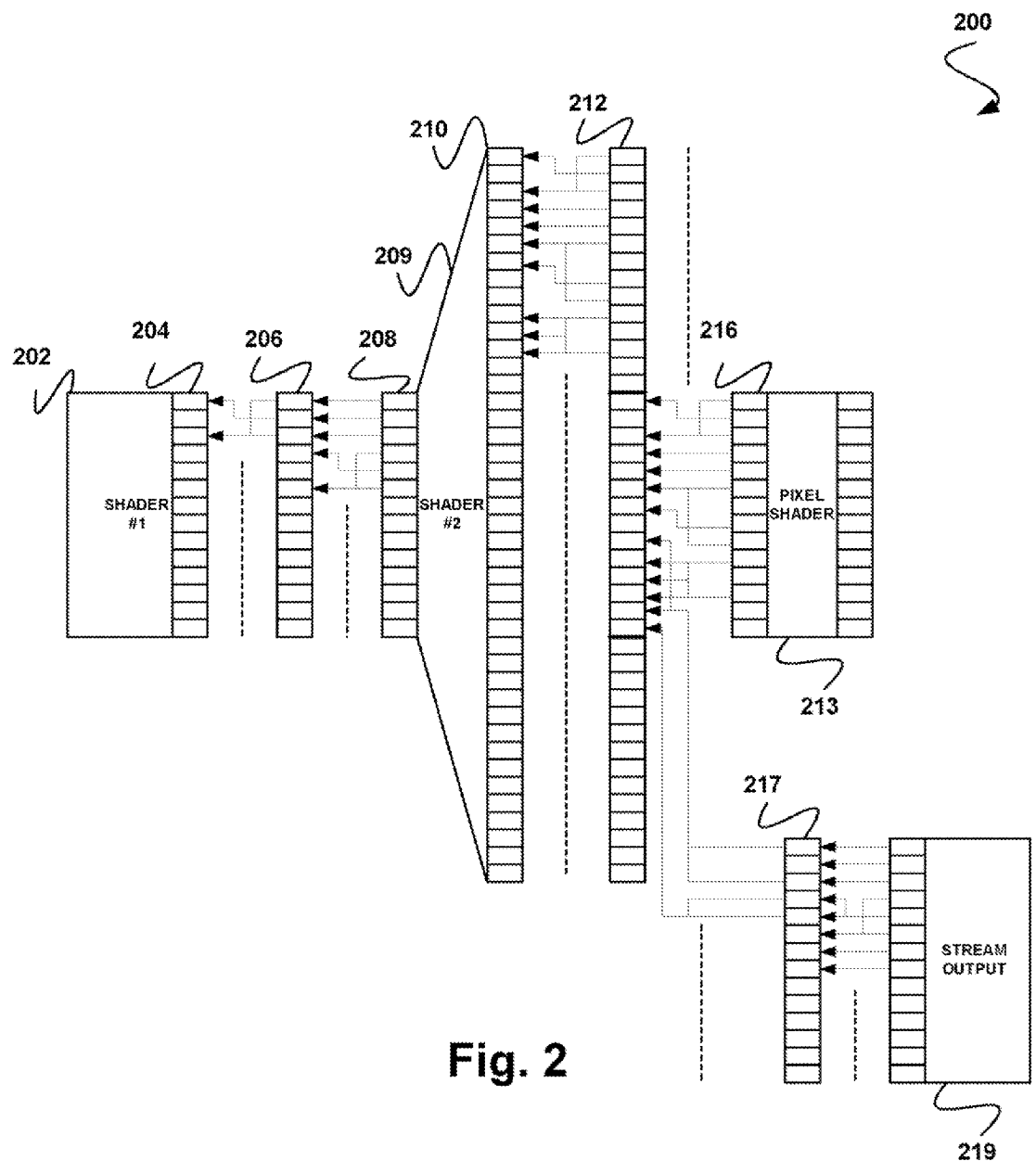
FIG. 2 shows a system for packing graphics attributes for use by a pixel shader, in accordance with one embodiment.

FIG. 2 shows a system 200 for packing graphics attributes for use by a pixel shader, in accordance with one embodiment. As an option, the present system 200 may be implemented to carry out the functionality of FIGS. 1A-1B. Of course, however, the system 200 may be implemented in any desired environment. Further, the aforementioned definitions may similarly apply during the description of the present figure.

As shown, the system 200 includes a plurality of shaders including a first shader 202, a second shader 209, a pixel shader 213, as well as a stream output 219 for feeding vertex data to a frame buffer (not shown). It should be noted that the first and second shaders 202, 209 may include a vertex shader, a geometry shader, a tessellation shader, and/or any other shader, for that matter. Further, while not shown, various other components may also feed or be fed by the pixel shader 213.

Further included is a plurality of reorder tables 206, 212, and 217 which provide an interface between their respective shaders, components, etc. In use, the reorder tables 206, 212, and/or 217 may be adapted for being used to map an output of a first shader to an input of a second shader. For example, in some embodiments, such mapping may be used to allow an input of one shader (in a first sequential position amongst a plurality of graphics attributes) to be mapped (e.g. translated, correlated, etc.) to an output of another shader (in a second, different sequential position amongst a plurality of graphics attributes).

Table 1 illustrates one generic exemplary mapping.

TABLE 1

| Output of First Shader | Input of Second Shader |
|---|---|
| 3 | 1 |
| 1 | 2 |
| 3 | 3 |

In the context of the shaders shown in FIG. 2, the mapping of Table 1 is shown implemented between an output 204 of the first shader 202 with respect to an input 208 of the second shader 209, where such mapping is facilitated by the reorder table 206. Of course, such generic mapping is set forth for illustrative purposes only and should not be construed as limiting in any manner.

As a further option, any of the reorder tables 206, 212, and/or 217 may include at least one default value (e.g. "0," "1," etc.) capable of being received by the input of one of the shaders in communication therewith. To this end, such default value may be read, as desired. In the context of graphics processing, it may sometimes be beneficial for obtaining such values, particularly to accommodate some graphics application program interfaces (APIs). For example, such default values may be used, in some embodiments, to accommodate calculations involving "w" coordinate values. Thus, by equipping the reorder tables 206, 212, and/or 217 with such value(s), they may be made more accessible to the associated shader.

Still yet, as shown, the number of inputs/outputs of each shader may vary, per the desires of the user. See, for example, the second shader 209 having an input 208 including a fraction of the number of outputs 210 thereof. Of course, any number of inputs/outputs may be employed. To accommodate such possible input/output disparity among shaders, the size of the reorder tables 206, 212, and/or 217 may also be tailored to accommodate an associated input/output with the most attributes, and also, the number of reorder table entries being used at a given time may also be a variable value loaded at the same time the reorder table is loaded. See, for example, reorder table 212 which accommodates the larger output 210 of the second shader 209. In one exemplary embodiment, one or more of the reorder tables (e.g. reorder table 212) may include a large number (e.g. 128, 129, or more) graphics attributes. An exemplary extended set of graphics attributes will be set forth during reference to FIG. 3.

During use, in addition to the aforementioned mapping, the reorder tables 206, 212, and/or 217 may also allow desired graphics attributes to be rearranged and/or packed in accordance with the methods 100 and 150 of FIGS. 1A and 1B, respectively. Specifically, the aforementioned mapping may be used to select a desired subset of graphics attributes associated with a first shader, re-arrange such attributes, and/or pack the same for optimal receipt by another shader (e.g. a pixel shader, etc.). More information will be set forth hereinafter regarding one specific set of graphics attributes that may be fed to the pixel shader 213 by the second shader 209 (which may take the form of a geometry shader, for example).

In a single-instruction multiple-data (SIMID) embodiment, multiple parallel processing threads may be operating on multiple pieces of data. When operating on multiple pieces of data corresponding to pixels, the parallel nature of such processing is complementary to such data, since pixels are positioned in a parallel manner on screen. However, when operating on multiple pieces of data corresponding to a vertex, such data is typically input in a sequential manner, which is not complimentary like pixel data. Thus, as an option, multiple pieces of data may be grouped and processed in "lock step," for allowing "corner turning" which allows writing of rows and reading of columns when such data is read for processing purposes.

Figure 3:
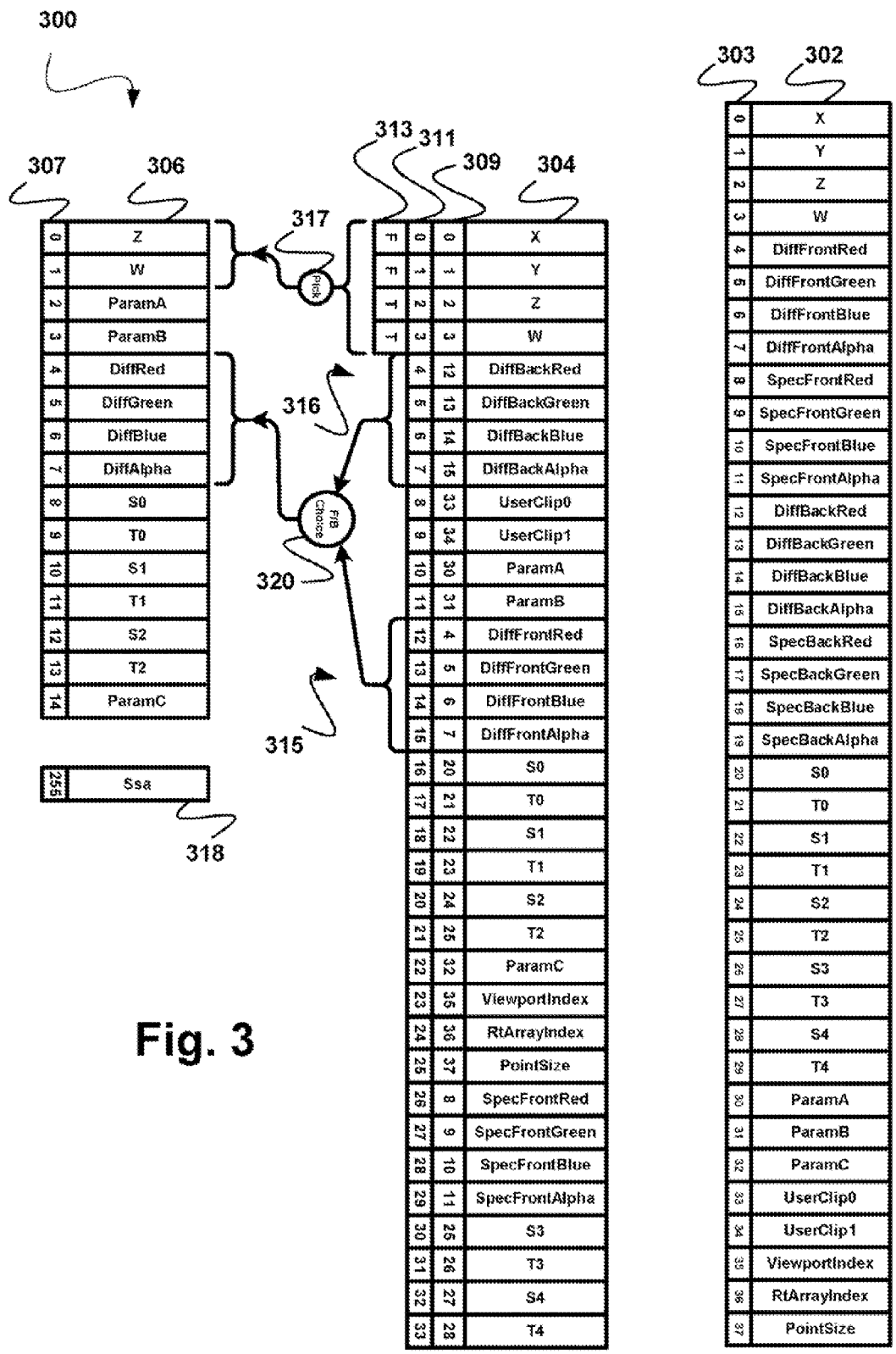
FIG. 3 shows a system for packing graphics attributes, in accordance with one embodiment.

FIG. 3 shows a system 300 for packing graphics attributes for use by a pixel shader, in accordance with one embodiment. As an option, the present system 300 may be implemented in the context of the system 200 of FIG. 2, and further to carry out the functionality of FIGS. 1A-1B. Of course, however, the system 300 may be implemented in any desired environment.

As shown, a geometry shader output 302 (e.g. see, for example, the output 210 of FIG. 2, etc.) includes a plurality of graphics attributes that are available for receipt by a pixel shader input 306 (e.g. see, for example, the input 216 of FIG. 2, etc.). Further shown in FIG. 3 are the geometry shades output locations 303 associated with the geometry shader output 302, as well as the pixel shader input locations 307 associated with the pixel shader input 306.

Situated between the geometry shader output 302 and the pixel shader input 306 is a reorder table 309 (e.g. see, for example, reorder table 212 of FIG. 2). Further shown, in association with the reorder table 309, is a plurality of temporary buffer locations 311 that indicate an order in which graphics attributes are read from the geometry shader output 302. Still yet, also included with the reorder table 309 is a list 304 of the attributes for easy reference. The entries in the reorder table 309 select from the plurality of geometry shader outputs 302 via their associated output locations 303. While not shown, one or more of the graphics attributes may include an enable designator (not shown), in addition to the above data structures, in order to indicate whether functionality associated with the attribute is enabled or not.

Further included in association with the reorder table 309 is a plurality of flags 313 associated with each of the coordinates x, y, z, and w. Such flags 313 may be used to indicate which, if any, of the coordinates are to be fed to the pixel shader input 306. For example, associated logic 317 may feed the associated coordinate if the flag, is "TRUE" and not feed the associated coordinate if the flag is "FALSE." Of course, while not shown, additional flags with similar functionality may be provided in association with texture coordinates (or any other graphics attributes, for that matter) for selectively inputting the same to the pixel shader. By this technique, only a minimal number of graphics attributes (which are required) are received by the associated pixel shader.

As shown, in addition to the graphics attributes mentioned hereinabove, the graphics attributes may further include front color attributes 315 and back color attributes 316, as well as the others shown in FIG. 3. Such front color attributes 315 may include color attributes associated with a front of an object to be rendered, while the hack color attributes 316 may include color attributes associated with a back of the object. Thus, by designating whether the front or back of the object is to be rendered (since it is facing toward or away from an eyepoint), the appropriate front or back color attributes may be chosen.

Further, with continuing reference to FIG. 3, an indicator 318 may be stored and tracked to determine whether the front color attributes or the back color attributes are applicable. Utilizing the indicator 318 in such a manner allows associated logic 320 to load only the applicable front or back color attributes into the pixel shader input 306, in the manner shown. Again, by this design, a minimal number of graphics attributes are received by the associated pixel shader. In addition, the indicator 318 can be an input to the pixel shader.

It should be again noted that the above rearrangement, packing, etc. is set forth for illustrative purposes only. Any rearrangement, packing, etc is contemplated to fall within the scope of the present technology. For instance, Table 2 illustrates an exemplary order of graphics attributes that may be used to rearrange, pack, etc. the graphics attributes in preparation for pixel shader processing.

TABLE 2

1) x, y, z, w coordinates;
2) Back colors (if needed);
3) User Clip Plane (UCP) Distances that are not pixel shader inputs;
4) UCP Distances that are inputs to the pixel shader;
5) Pixel shader interpolated inputs other than UCP Distances, including front colors in one group;
6) Pixel shader non-interpolated inputs, possibly including ViewportIndex, RenderTargetArrayIndex, and/or PointSize; and
7) ViewportIndex, RenderTargetArrayIndex and/or PointSize (if needed and not already included as pixel shader inputs), and any attributes for streaming output that are not used elsewhere (if needed).

While not shown, similar techniques may be employed to feed other components of a graphics pipeline. Just by way of example, the foregoing functionality may be employed to feed a data stream which, in turn, may feed a frame buffer, etc. Of course, graphics attributes in a reorder table may be used by more than one graphics pipeline component (e.g. a pixel shader and a data stream, etc.), such that some of the graphics attributes are used by one component or the other, or both.

Figure 4:
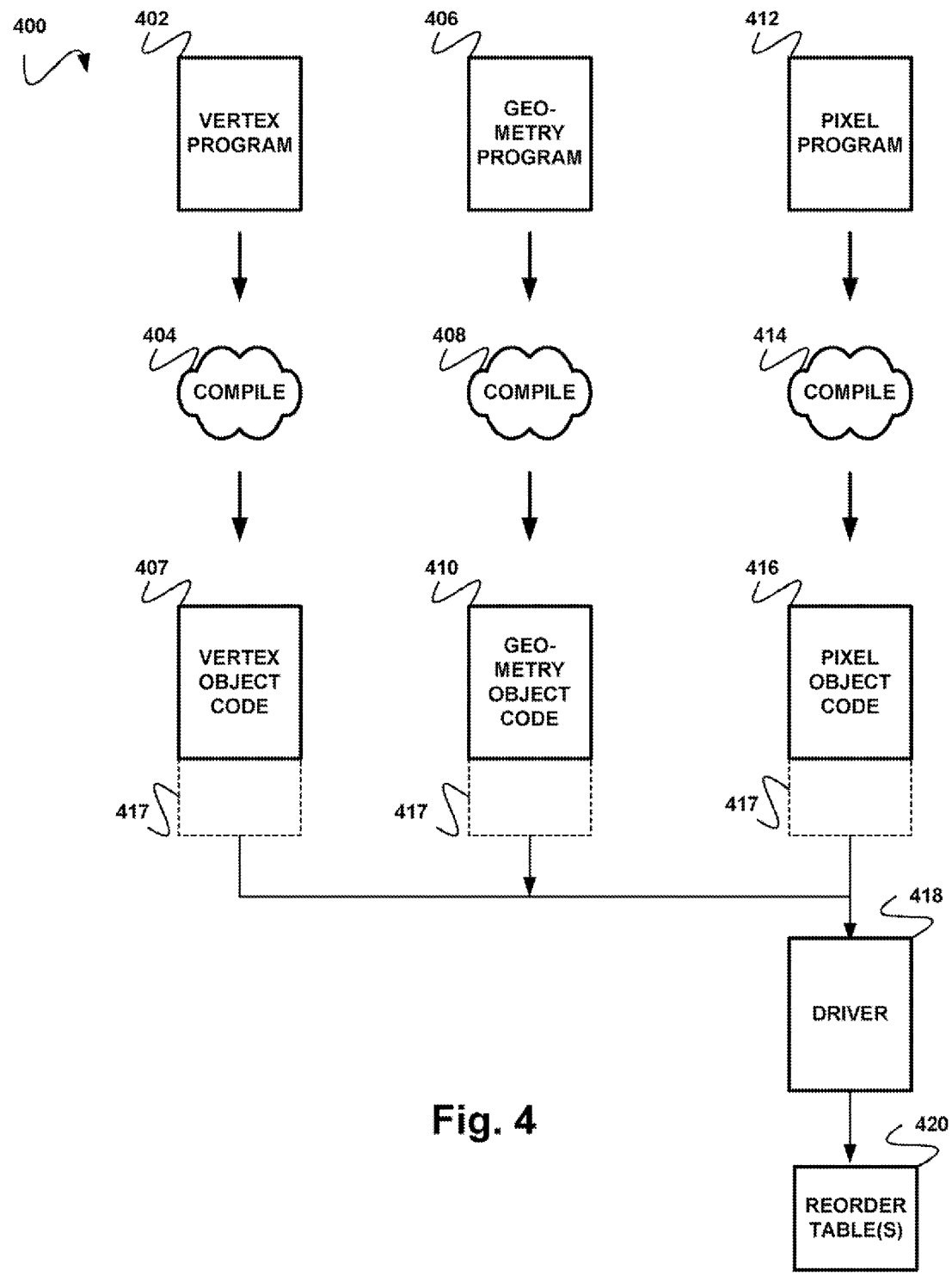
FIG. 4 shows a system for using a driver to facilitate graphics attribute packing, in accordance with another embodiment.

FIG. 4 shows a system 400 for using a driver to facilitate graphics attribute packing, in accordance with one embodiment. As an option, the present system 400 may be implemented in the context of the systems of FIGS. 2 and 3, and further to carry out the functionality of FIGS. 1A-1B. Of course, however, the system 400 may be implemented in any desired environment.

As shown, a plurality of programs is provided including, but not necessarily limited to a vertex program 402, a geometry program 406, and a pixel program 412. Each of such programs is associated with a corresponding shader which is capable of executing the same.

To facilitate such execution, each of the programs is compiled via operations 404, 408, and 414, respectively, carried out by a compiler. Resulting from such compilation is object code including, but not limited to vertex object code 407, geometry object code 410, and pixel object code 416. Still yet, each set of object code includes a data structure 417 associated with the object code compiled from the shader programs. For reasons that will soon become apparent, such data structure 4117 may be monitored by a driver 418, and includes a state of the object code.

Specifically, each of such sets of object code selects their own input. Sometimes, however, a set of object code may select an input at location A, which correlates with the output of another set of object code at location B. Further, in use, each set of object code has its own "domain" with corresponding input and output locations, which change temporarily. To accommodate this, each set of object code may be "bound," where such binding is reflected in the data structure 417, to ensure that the appropriate data may be received from the desired shader(s).

Thus, the driver 418 may use the data structure 417 associated with each of the sets of object code for generating and updating one or more reorder tables 420 to reflect the aforementioned temporal changes during operation. Further, as an option, the driver 418 may generate such reorder table 420 during runtime.

Figure 5:
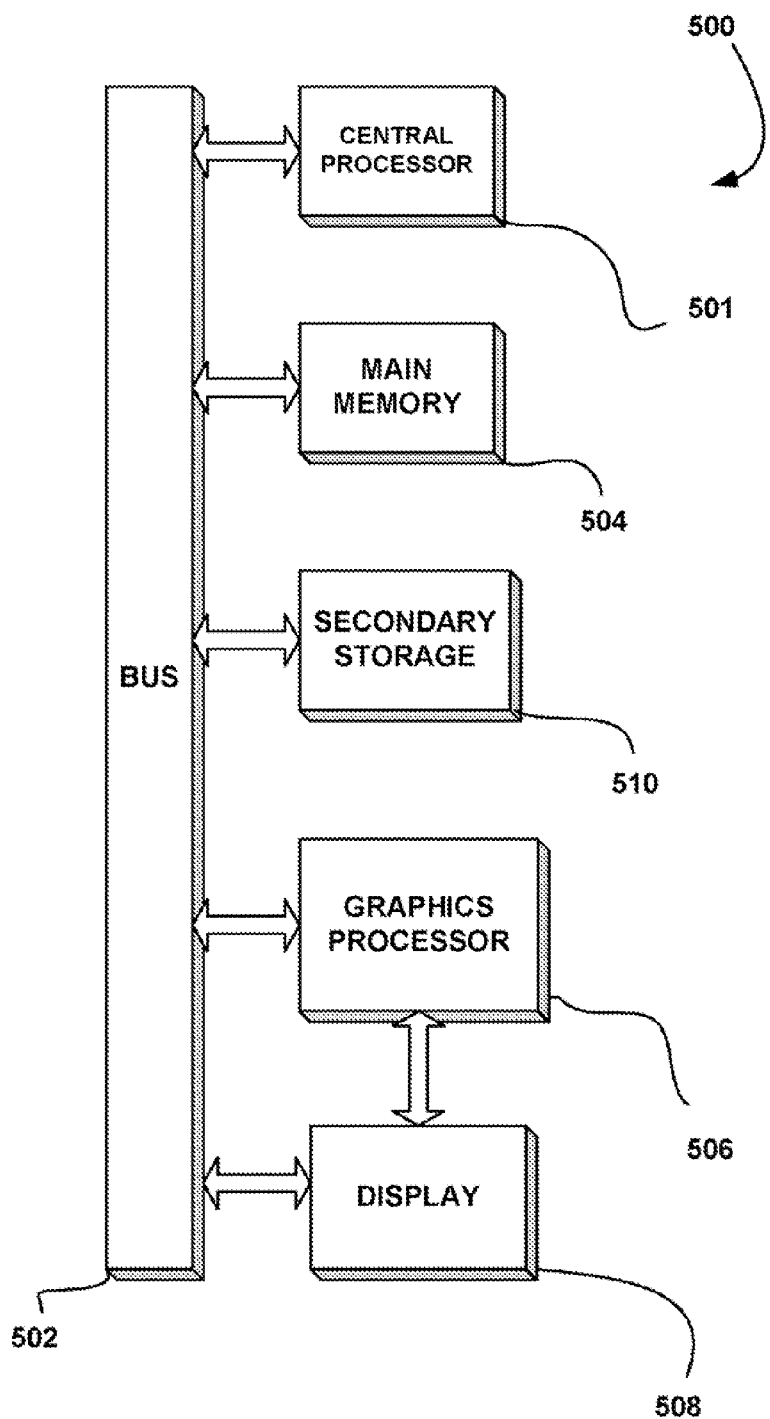
FIG. 5 illustrates an exemplary computer system, in accordance with one embodiment.

FIG. 5 illustrates an exemplary computer system 500, in accordance with one embodiment. As an option, the computer system 500 may be implemented in the context of any of the devices of the network architecture 500 of FIG. 5. Of course, the computer system 500 may be implemented in any desired environment.

As shown, a computer system 500 is provided including at least one central processor 501 which is connected to a communication bus 501. The computer system 500 also includes a main memory 504. Control logic (software) and data are stored in the main memory 504 which may take the form of random access memory (RAM).

The computer system 500 also includes a graphics processor 506 and a display 508, i.e. a computer monitor. In one embodiment, the graphics processor 506 may include shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

In one embodiment, the architecture and/or functionality set forth during the description of the foregoing figures may be implemented in the context of the central processor 501, graphics processor 506, a chipset (i.e. a group of integrated circuits designed to work and sold as a unit for performing related functions, etc.), and/or any other integrated circuit(s) for that matter.

Still yet, the architecture and/or functionality of the foregoing figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying a graphics attribute stream comprising a plurality of graphics attributes, the plurality of graphics attributes including front color attributes and back color attributes;
identifying a subset of the plurality of graphics attributes having overwrite capabilities;
rearranging the plurality of graphics attributes of the graphics attribute stream by moving the subset of graphics attributes having overwrite capabilities before other graphics attributes of the graphics attribute stream;
packing the rearranged graphics attributes such that the subset of graphics attributes having overwrite capabilities and the other graphics attributes are arranged into a contiguous set of graphics attributer without a null value positioned between the subset of graphics attributes having overwrite capabilities and the other graphics attributes; and
processing the packed graphics attributes utilizing a pixel shader of a processor, by:
receiving, at the pixel shader, input including an indicator as to whether the front color attributes or the back color attributes are applicable color attributes, and
inputting only the applicable color attributes to the pixel shader, based on the indicator.

2. The method as recited in claim 1, wherein the graphics attribute stream is received from another shader including at least one of a vertex shader, a geometry shader, and a tessellation shader.

3. The method as recited in claim 1, and further comprising separating the plurality of graphics attributes into a plurality of groups.

4. The method as recited in claim 3, wherein the groups include a first group including interpolated attributes.

5. The method as recited in claim 4, wherein the groups include a second group including non-interpolated attributes.

6. The method as recited in claim 1, wherein the graphics attributes further include at least one of color attributes, clipping attributes, point size attributes, and coordinates.

7. A system adapted for performing the method as recited in claim 1, the system including a graphics processing unit in communication with a central processing unit and a display.

8. The method as recited in claim 1, wherein the plurality of graphics attributes includes a set of graphics attributes that is, at least in part, not required by the pixel shader.

9. The method as recited in claim 1, wherein the graphics attributes having overwrite capabilities are saved in a temporary buffer until the other graphics attributes arrive, and then the graphics attributes having overwrite capabilities take the place of the other graphics attributes.

10. The method as recited in claim 1, wherein if vertex coordinates are received before the plurality of graphics attributes, then clipping parameters are computed before the packed graphic attributes are processed.

11. The method as recited in claim 1, wherein before the packed graphics attributes are processed, the plurality of graphics attributes are pre-processed by at least one of plane equation generation, clamping values of the plurality of graphics attributes, and interpolation of the values of the plurality of graphics attributes.

12. The method as recited in claim 1, wherein the front color attributes include colors associated with a front of an object to be rendered and the back color attributes include colors associated with a back of the object to be rendered.

13. The method as recited in claim 1, wherein the rearranged graphics attributes are packed utilizing a reorder table, a plurality of temporary buffer locations in association with the reorder table, and a plurality of flags in association with the reorder table.

14. The method as recited in claim 13, wherein the plurality of flags in association with the reorder table indicate which of the rearranged graphics attributes are to be packed, such that a first graphic attribute associated with a first predetermined flag is packed in the rearranged graphics attributes, and a second graphics attribute associated with a second predetermined flag is prevented from being packed in the rearranged graphics attributes.

15. The method as recited in claim 13, wherein the reorder table is sized to accommodate a disparity between a first number of graphics attributes received in the graphics attribute stream and a second number of graphics attributes associated with a size of the pixel shader of the processor.

16. A computer program product embodied on a non-transitory computer readable medium, comprising:
   computer code for identifying a graphics attribute stream comprising a plurality of graphics attributes, the plurality of graphics attributes including front color attributes and back color attributes;
   computer code for identifying a subset of the plurality of graphics attributes having overwrite capabilities;
   computer code for rearranging the plurality of graphics attributes of the graphics attribute stream by moving the subset of graphics attributes having overwrite capabilities before other graphics attributes of the graphics attribute stream;
   computer code for packing the rearranged graphics attributes such that the subset of graphics attributes having overwrite capabilities and the other graphics attributes are arranged into a contiguous set of graphics attributes without a null value positioned between the subset of graphics attributes having overwrite capabilities and the other graphics attributes; and
   computer code for processing the packed graphics attributes utilizing a pixel shader of a processor, by:
      receiving, at the pixel shader, input including an indicator as to whether the front color attributes or the back color attributes are applicable color attributes, and
      inputting only the applicable color attributes to the pixel shader, based on the indicator.

\* \* \* \* \*

UNITED STATES PATENT AND TRADEMARK OFFICE
CERTIFICATE OF CORRECTION

PATENT NO. : 8,134,570 B1
APPLICATION NO. : 11/532779
DATED : March 13, 2012
INVENTOR(S) : Duluk, Jr. et al.

It is certified that error appears in the above-identified patent and that said Letters Patent is hereby corrected as shown below:

In the claims:
Claim 1, col. 8, line 43; please replace "attributer" with --attributes--.

Signed and Sealed this
Tenth Day of July, 2012

David J. Kappos
*Director of the United States Patent and Trademark Office*